BEST AVAILABLE COPY

W. H. MAXWELL.

Assignor to the NATIONAL CASH REGISTER COMPANY.

CASH REGISTER AND INDICATOR.

No. 10,885. Reissued Nov. 29, 1887.

Witnesses:
W. C. Jirdinston.
Charles Billon.

Inventor:
Walter H. Maxwell
by Peck & Rector
his Attorneys.

BEST AVAILABLE COPY

W. H. MAXWELL.

Assignor to the NATIONAL CASH REGISTER COMPANY.

CASH REGISTER AND INDICATOR.

No. 10,885. Reissued Nov. 29, 1887.

*Witnesses:*
W. C. Jirdinston.
Charles Billon.

*Inventor:*
Walter H. Maxwell
by Peck & Rector
his Attorneys.

BEST AVAILABLE COP

UNITED STATES PATENT OFFICE.

WALTER H. MAXWELL, OF CINCINNATI, ASSIGNOR TO THE NATIONAL CASH REGISTER COMPANY, OF DAYTON, OHIO.

CASH REGISTER AND INDICATOR.

SPECIFICATION forming part of Reissued Letters Patent No. 10,885, dated November 29, 1887.

Original No. 325,260, dated September 1, 1885. Application for reissue filed August 31, 1887. Serial No. 248,420.

*To all whom it may concern:*

Be it known that I, WALTER H. MAXWELL, a resident of Cincinnati, in the county of Hamilton and State of Ohio, have invented certain new and useful Improvements in Cash Registers and Indicators, of which the following is a specification.

My invention relates particularly to improvements in devices for actuating the registering mechanism; to improvements in the registering mechanism itself; in devices for automatically locking the mechanism and preventing its operation while the drawer is open; in devices for facilitating and simplifying computations of the cash received and registered; in devices for supporting the indicating-tablets with greater certainty, and generally in devices by which greater simplicity of construction and ease of operation are attained.

Figure 3:
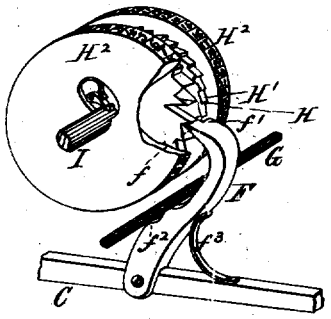
Figure 1:
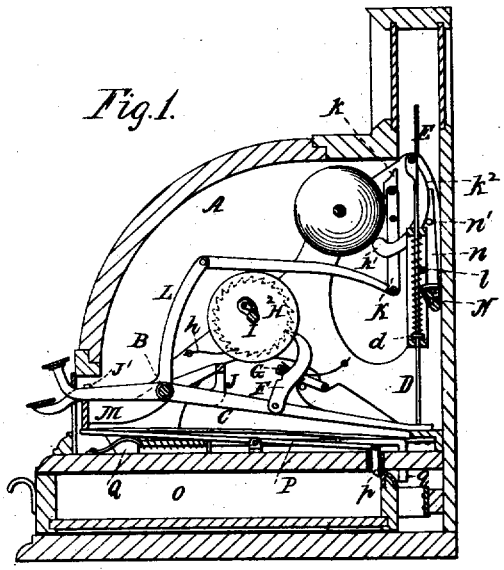
Figure 7:
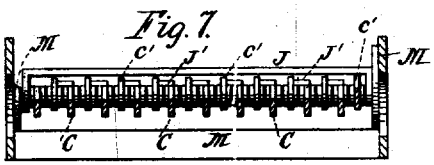
Figure 9:
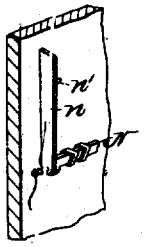
Figure 8:
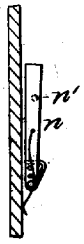
Figure 4:
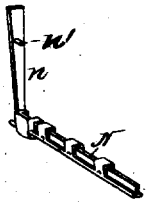
Figure 2:
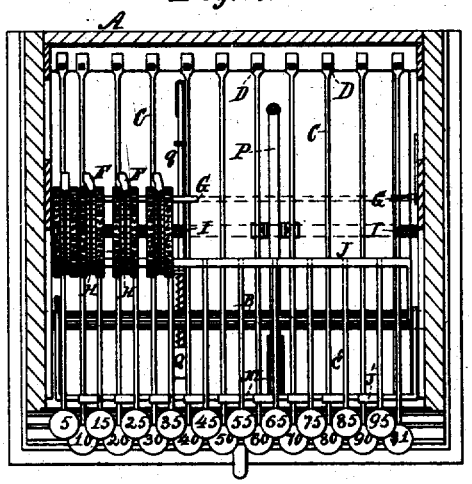
Figure 5:
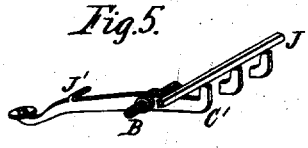
Figure 6:
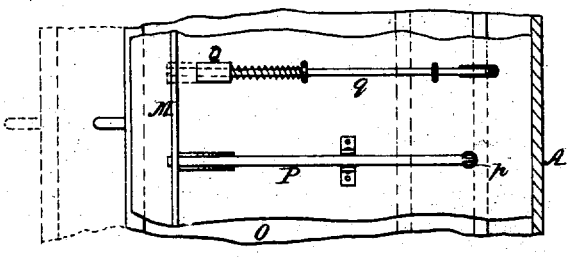

In the drawings, Figure 1 is a side elevation in section. Fig. 2 is a plan view; Fig. 3 a perspective side view of a pair of registering-wheels, cut away to show serrated edges and the pallet by which they are operated. Fig. 4 is a perspective view of the wing and wing-arm, showing individual springs. Fig. 5 is a sectional view showing short arms and five-cent bar, and Fig. 6 is a sectional plan view showing the locking device and spring-catch. Fig. 7 is a vertical section in the rear of the five-cent bar. Fig. 8 is a detail of the wing-arm; and Fig. 9, a detail showing a portion of the wing, individual springs, and the wing-arm.

A is a case provided with suitable framework for supporting the mechanism.

B is a pivot-bar extending from side to side of the case, on which are balanced long lever arms or keys, C, and shorter lever arms or keys C', in such manner that the front ends of the lever-arms extend through the front of the case and are lighter than the inner ends, thus keeping the keys in their normal position until buttons, with which their projecting ends are provided, are pressed down. The longer keys are provided with buttons indicating five and the even multiples thereof, and the shorter keys with buttons indicating the odd multiples of five beyond the first power. The arms C extend to the rear of the machine and have their inner ends flattened to support rods D, at the top of which are indicating-tablets E. These indicating-tablets are pushed up into a chamber having a front of glass, through which the tablets may be seen, after the usual manner in such contrivances, the case being so arranged as to conceal when shut and locked all of the actuating and registering mechanism.

On the longer keys, C, between the pivot-bar and the supporting-rods, are pivoted pallets F. These pallets have each two teeth, $f$ and $f'$, the former being somewhat longer than the latter, and are preferably of the shape shown in Fig. 3, having a shoulder, $f^2$, which is arranged to come in contact with a disengaging-bar, G, when raised to a certain height.

Pairs of registering ratchet-wheels, H H', are mounted side by side on a shaft, I, above the keys, one wheel to register each payment, the other to register the revolutions of the first. As the former is moved a greater distance at each pallet-actuation than the latter, the number of notches or serrations on the second wheel will be considerably more than that of those on the first.

The number of lever arms or keys is fixed by convenience and with reference to the work to which the contrivance is to be put. Twenty are represented in the drawings, the buttons thereon indicating every multiple of five up to one hundred. Every key, except those which indicate odd multiples of five, has its own pallet and operates its own pair of register-wheels, as follows: When the button is depressed—for instance, the twenty-cent button—the pallet which its key bears engages its longer tooth in a serration and pushes the ratchet-wheel forward until the shoulder on the pallet reaches the disengaging-bar. This disengaging-bar is swung on arms pivoted to the side of the frame back of the pallet, and when in its normal position will be above the plane of the pivotal points. As the shoulder of any pallet engages with it, it is raised, moving the pallet through an arc of a circle having the supporting-arms as radii, and thus disengaging it from the wheel. Fast to these cog-wheels are plain wheels H², on which are numbers 0 1 2 3 4, &c., up to the total number of cogs, so that if the register-wheels be set at 0 the first depression of the twenty-cent button moves the ratchet-wheel through one space

BEST AVAILABLE COPY and shows on the reading-surface the number 1. The next depression of the button shows the number 2 as the reading of the register-wheel, and so on till it has made a complete revolution, when the longer tooth enters the deeper serration, thus allowing the shorter tooth to engage with the serration corresponding to the number 0 on the companion wheel, so that both wheels are moved forward together, the number 0 appearing on the former and the number 1 on the latter. In this way, if there are forty notches or serrations on the former and sixty on the latter, twenty-four hundred twenty-cent cash payments will be registered by one revolution of the latter wheel, this wheel registering the number of revolutions the first wheel has made.

Any suitable device for checking the movement of the register-wheel, when the actuating-pallet is disengaged, may be employed as a brake—for instance, as shown in the drawings, a series of curved flat springs, *h*.

A spring, $f^2$, is set on each long key to press upon the pallet, insuring each tooth or teeth entering the proper notch until the shoulder reaches the disengaging-bar.

The shorter keys, which indicate the odd multiples of five—fifteen, twenty-five, thirty-five, &c.—have their extremities bent upward and coming under a five-cent bar, J, as shown most clearly in Fig. 5. This five-cent bar is firmly attached to the five-cent key and passes at right angles above all the keys, and is supported at the other end by an arm, through which the shaft B passes. These shorter keys have also attached to each of them lugs J′, projecting slightly to one side over the nearest long key, or under the key if the lugs are placed back of the shaft.

It will be seen that when the button attached to any short key is depressed—for instance, the twenty-five-cent button—it operates the five-cent key by means of the five-cent bar, and also the twenty-cent key by means of the projecting lug J′, thus moving the twenty-cent and five-cent register-wheels each forward one notch and throwing up into sight the twenty-cent and five-cent tablets, in the usual manner. As the keys are very nearly balanced on the pivot-bar, (having merely sufficient excess of weight in the rear to keep them in the position shown in Fig. 1 when not pressed down,) nearly the whole force exerted in pressing down any button goes to operate a cross-bar, M, beneath the keys at the forward end. This cross-bar is raised under the keys by a suitable spring, is depressed by the keys, and returns the mechanism to its normal position after the key which has been depressed is released.

It will readily be seen that no appreciably greater power is needed to depress the 15, 25, 35, &c., keys when operated in the manner indicated than if each operated as the 5, 10, 20, 30, &c., keys operate, and that this arrangement diminishes the number of parts in the machine, lightens the labor of the final computation of cash received, assists in rendering less the possibility of the attendant registering any other amount than that actually placed in the box, and has other obvious advantages over the old method.

I prefer the use of the kind of five-cent bar shown in the drawings, though other constructions are evidently possible. For instance, the five-cent bar may be slotted, allowing the longer keys to pass through the cut-away portions, while the shorter keys (in this case straight and not bent up at the end) would come under the depending portions, and thus actuate the five-cent arm, as in the preferred construction.

By the same depression of the button above mentioned the rod D, bearing the indicating-tablet E, is raised, and a lever, K, link-connected at its lower end with a bell-crank, L, (the lower extremity of which is firmly attached to the cross-bar M,) and having at its upper end a trip, *k*, which presses positively against the bell-hammer $k'$ and forces it against the stress of a spring, $k^2$, is drawn back, bringing the trip *k* into contact with a cam-like shoulder on the bell-hammer. Back of the series of supporting-rods, and about midway of their height, is a wing, N, on which are a number of individual springs—one for each supporting-rod—and upward from which extends an arm, *n*, by which the wing may be moved backward far enough to allow the collars to repass it and the tablets to fall. As the rod rises, its collar *d*, one face of which is slightly beveled, slides past its individual spring without moving the wing, and the spring then comes back to its normal position and prevents the repassage of the collar before the bell-hammer has begun to act on a pin, $n'$, on the arm of the wing. The depression of the button continuing, the trip passes the boss of the shoulder, causing the bell-hammer to push the wing-arm and wing back and allow the tablet previously raised to drop, and at the same time releases the bell-hammer, which at once is driven back against the bell by the spring $k^2$, and the collar on the rod bearing the tablet is allowed to fall upon the wing.

Hitherto it has been possible in any cash register and indicator of this general class, by careful and adroit manipulation, to cause several of the tablets to fall together to their normal position without ringing the bell, registering, or leaving the tablet manipulated in view, which latter results could be attained only by depressing the button as far as possible, thus enabling or allowing a dishonest or careless attendant to register less than the actual amount received by dropping all indicating-tablets out of sight. While in the present invention it is evident that, as the passage of any collar forces back, not the entire length of the wing, but merely the individual spring opposed to each collar-bearing rod, it is impossible that the wing-supported tablets should fall until the wing is drawn back by other force than the pressure of the collars in passing, which force is exerted by the bell-hammer against a stop on the arm projecting up from the wing, the bell-hammer forcing this arm back far enough to allow the collars to pass the wing at the instant the trip passes the shoulder of the bell-hammer, so that the dropping of all the tablets previously raised and the striking of the bell are simultaneous and immediately follow the movement of the registering-wheel, instead of preceding, as in former machines.

The tablet raised by the depressed button is not let fall till the finger is lifted from the button and cannot pass the wing until the bell is struck again. These individual springs may be attached to either rod or wing.

A coiled spring fast at one end to the frame and at the other to the wing imparts to the wing an impulse to return to its normal position, and its forward movement is checked by a screw head or stop, which prevents its striking the rods and stops it when almost touching them.

Another feature of my invention is the device by which the mechanism is locked while the cash-drawer is unlocked and by which no second registry can be made till the drawer is again closed, thus serving as a guard against both dishonesty and carelessness, and giving the customer an opportunity to see on the indicating-tablets the amount which has been registered before turning away or receiving his change.

The cash drawer when closed is locked by the depending bolt *p* on the rear end of a spring-pressed bent lever, P, and the back of the drawer presses against the bent-down end of a rod, *q*, the front end of which bears a block, Q. When the drawer is closed, this block is pulled away from under the cross-bar M, which is then free to descend when pressed down by any of the keys C. The cross-bar in its descent presses on one arm of the bent lever P and draws the bolt *p* at the end of the other arm, allowing the drawer to open. When the drawer is opened even slightly and the button released, the bent end of the rod *q* no longer being held by the back of the drawer, the block Q is pressed by a spring on rod *q* under cross-bar M, which thus cannot descend again until the drawer is closed and the block withdrawn in the manner indicated. It is evident, then, that when a button is depressed the first thing effected is the movement of the proper wheel or wheels of the registering device by the appropriate pallet or pallets. This done and the depression of the button continuing, the indicating-tablet next comes into view and the drawer unlocks. Then the bell is struck and the tablet falls until the collar on its supporting-rod reaches the wing, but no farther until the drawer is closed and the machine again operated. The next step is to put the proper amount of cash into the drawer and close it. This locks the drawer automatically and unlocks the keys. Another payment being made, the proper key is depressed, the amount of it registered, the indicating-tablet raised, the previously-raised indicating-tablet let fall, the bell struck, the keys unlocked, and so on *ad infinitum*. The disengaging-bar may be fast to the sides of the frame and operate on the pallets by means of cam-like shoulders upon them.

Another method of locking the mechanism when the drawer is open is by a bent flat spring fast at one end to the upper side of the drawer-chamber, and allowing the drawer to slide under it and raise it. Up from this spring and supported thereby runs a rod having a hook at the end, which grasps the link connected to the bell-crank and prevents its moving. When the drawer is closed, the link is released, as by the first-described and preferable device.

Having thus fully described my invention, I claim—

1. In a cash register and indicator, the combination, with a series of keys, a series of supporting-rods carrying indicating-tablets and each provided with a shoulder or collar, and a wing, of a series of individual springs, one for each supporting-rod, arranged to engage with the collars on said supporting-rods, substantially as and for the purpose described.

2. In a cash register and indicator, the combination, with the operating-keys, the wing, and suitable actuating mechanism, of a series of supporting-rods carrying indicating-tablets, each of said rods having upon it a shoulder or collar, and a series of individual springs on said wing, so arranged as to allow the collars to pass the wing without moving the wing and to support them until the wing is moved by mechanism independent of the supporting-rods, substantially as described.

3. In a cash register and indicator, the combination, with a series of keys carrying a series of rods which support indicating-tablets, each rod fitted with a collar or shoulder, of a wing having upon it a series of independent springs, one for each rod, said wing being operated by mechanism wholly distinct from the supporting-rods, so that by operating any of the keys the collar on the supporting-rod passes its individual spring on the wing without moving the wing and on releasing the key the collar on the supporting-rod falls back on the wing, substantially as described.

4. In a cash register and indicator, the combination of a series of keys upon which are pivoted pallets for the operation of a registering device, with a series of pairs of registering-wheels, a series of rods supporting indicating-tablets, each rod fitted with a collar or shoulder, and a wing provided with a series of independent springs, one for each rod, said wing being operated by mechanism distinct from the supporting-rods, so that when any of the series of keys is operated the collar on the supporting-rod passes its individual spring without moving the wing, and on releasing the key the collar on the supporting-rod falls back on the wing.

BEST AVAILABLE COP'

5. In a cash register and indicator, the combination, with the keys and a cross-bar beneath said keys adapted to be depressed thereby, of a bell-crank fast to said cross-bar and link-connected to a lever having a trip thereupon, a bell-hammer, and a wing provided with an arm extending upward therefrom adapted to be pushed backward by the bell-hammer when the bell-hammer is drawn back to nearly its limit of motion.

6. In a cash register and indicator, the combination of a series of keys upon which are pivoted pallets for the actuation of a registering device, a series of rods supporting indicating-tablets, each rod fitted with a collar or shoulder, with a cross-bar beneath said keys adapted to be depressed thereby, a bell-crank fast to said cross-bar, a link connected to the lever and having a trip thereupon, a bell-hammer, and a wing provided with an arm extending upward therefrom adapted to be pushed backward by the bell-hammer when drawn back to nearly its limit of motion, thereby releasing the previously-raised indicating-tablets.

7. In a cash register and indicator, the combination, with a series of keys, a cross-bar below said keys, and an automatically-locking cash-drawer, of a locking device arranged to prevent operation of the machine while the cash-drawer is open, substantially as described.

8. In a cash register and indicator, the combination, with a series of keys, a cross-bar below said keys, and a cash-drawer, of a block-spring pressed under said cross-bar when the drawer is open and automatically withdrawn by the closing of the drawer to lock and release the operative mechanism, substantially as described.

9. In a cash register and indicator, the combination, with a series of keys indicating odd multiples of five above the first power, of a five-cent bar extending across said keys and arranged to be actuated thereby, substantially as and for the purpose specified.

10. In a cash register and indicator, the combination, with the five-cent-registering wheel and a series of keys indicating odd multiples of five above the first power, of a five cent bar extending across said keys and arranged to be actuated thereby, and connecting mechanism between the five-cent bar and the five-cent wheel, substantially as and for the purpose described.

11. In a cash register and indicator, the combination, with a series of keys indicating even and odd multiples of five, of a five-cent bar extending across said keys and arranged to be actuated by the keys which indicate odd multiples of five, substantially as and for the purpose described.

12. In a cash register and indicator, the combination, with a series of keys indicating even and odd multiples of five and registering mechanism operated by said keys, of a five-cent bar extending across said keys and arranged to be actuated by the keys which indicate odd multiples of five, substantially as and for the purpose described.

13. In a cash register and indicator, the combination, with a series of registering-wheels indicating five and its even multiples, of a five-cent bar and a series of keys of which those indicating odd multiples of five are arranged to engage with the five-cent bar and actuate the five-cent-registering wheel and the wheel registering the next lower even multiple of five, substantially as and for the purpose described.

14. In a cash register and indicator, the combination, with a series of registering-wheels indicating five and its even multiples, of a five cent bar and a series of keys of which those indicating odd multiples of five are arranged to engage with and actuate the five-cent bar and the key indicating the next lower even multiple of five, substantially as and for the purpose described.

15. As an improvement in actuating devices in cash registers and indicators, the combination, with the keys and the registering-wheels, of a disengaging-bar extending from side to side of the frame above the keys, and actuating-pallets having a cam-like shoulder, said shoulder being so placed as to cause its pallet to rise and disengage from the register wheel or wheels at the proper moment when said shoulder comes in contact with the disengaging-bar.

16. As an improvement in actuating devices in cash registers and indicators, in combination with the keys and register-wheels, a disengaging-bar supported by arms pivoted on the sides of the frame, and actuating-pallets, each having a shoulder so placed that when said shoulder meets the disengaging-bar the disengaging-bar moves through the arc of a circle having the supporting-arms as radii and disengages the pallet from the register wheel or wheels, substantially as described.

17. In a cash registering and indicating machine, the combination of the long and short keys, the five-cent bar, the registering-wheels, the pallets arranged to actuate said registering-wheels positively and primarily, the disengaging-bar operated by the pallets, the rods on the inner ends of the keys, supporting indicating-tablets, and provided with collars or shoulders, the wing carrying a series of individual springs, one for each supporting-rod, which permit the rods to go up freely but prevent their repassing the wing until it is actuated by mechanism entirely apart from the supporting-rods, the cash-drawer, and an automatic locking device by which operation of the machine is prevented by the opening of said cash-drawer substantially as described.

WALTER H. MAXWELL.

Witnesses:
E. W. RECTOR,
W. C. JIRDINSTON.